US00RE42720E

(19) United States
(12) Reissued Patent
Tanaka et al.

(10) Patent Number: US RE42,720 E
(45) Date of Reissued Patent: Sep. 20, 2011

(54) FUEL CELL MOUNTING STRUCTURE

(75) Inventors: Hideyuki Tanaka, Kariya (JP); Toru Bisaka, Kariya (JP); Akira Aoto, Okazaki (JP); Hiroaki Nishiumi, Toyota (JP); Yutaka Hotta, Toyota (JP); Shunichi Shibasaki, Toyota (JP); Susumu Oda, Seto (JP)

(73) Assignee: Toyota Jidosha Kabushiki Kaisha, Toyota-shi (JP)

(21) Appl. No.: 11/545,821

(22) Filed: Oct. 11, 2006

Related U.S. Patent Documents

Reissue of:

(64) Patent No.: 6,803,142
Issued: Oct. 12, 2004
Appl. No.: 10/158,906
Filed: Jun. 3, 2002

(30) Foreign Application Priority Data

Jun. 6, 2001 (JP) ..... 2001-171442
Jun. 7, 2001 (JP) ..... 2001-172121
Jun. 11, 2001 (JP) ..... 2001-175510

(51) Int. Cl.
*H01M 2/20* (2006.01)

(52) U.S. Cl. ..... 429/469; 429/467; 429/470; 429/511

(58) Field of Classification Search ..... 429/34, 429/35, 37, 36, 30, 38, 39, 22
See application file for complete search history.

(56) References Cited

U.S. PATENT DOCUMENTS 5,547,777 A 8/1996 Richards
6,200,698 B1 3/2001 Carlstrom, Jr.
6,638,650 B1 * 10/2003 Bailey et al. ..... 429/13
2005/0003260 A1 * 1/2005 Hatoh et al. ..... 429/35

FOREIGN PATENT DOCUMENTS

| | | | |
|---|---|---|---|
| DE | 100 49 801 | A1 | 4/2001 |
| JP | 60062064 | A | 4/1985 |
| JP | 62184777 | A | 8/1987 |
| JP | 01279575 | A | 11/1989 |
| JP | 03067468 | A | 3/1991 |
| JP | 04075263 | A | 3/1992 |
| JP | 04296463 | A | 10/1992 |
| JP | 05-041228 | A | 2/1993 |
| JP | HEI 05-047407 | A | 2/1993 |
| JP | 05082157 | | 4/1993 |
| JP | 05089801 | A | 4/1993 |
| JP | 06275307 | | 9/1994 |
| JP | 2007-014589 | A | 1/1995 |

(Continued)

OTHER PUBLICATIONS

German Language Version of German Office Action for Appln. No. 102 24 962.8-45 dated Mar. 9, 2005.

(Continued)

*Primary Examiner* — Raymond Alejandro
(74) *Attorney, Agent, or Firm* — Kenyon & Kenyon LLP

(57) ABSTRACT

A housing case that houses a fuel cell is provided with mounts for fixing two ends of a lower surface of an end plate that retains stacked unit cells of the fuel cell, and a mount for fixing a central portion of a lower surface of another end plate. Using these three mounts, the fuel cell is fixed to the housing case.

30 Claims, 11 Drawing Sheets

FOREIGN PATENT DOCUMENTS

| | | | |
|---|---|---|---|
| JP | HEI 08-162143 | A | 6/1996 |
| JP | HEI 08-171926 | A | 7/1996 |
| JP | 09083616 | A | 3/1997 |
| JP | 10189025 | A | 7/1998 |
| JP | 10-509841 | | 9/1998 |
| JP | 10308229 | A | 11/1998 |
| JP | 10340736 | A | 12/1998 |
| JP | HEI 11-185789 | A | 7/1999 |
| JP | HEI 11-185790 | A | 7/1999 |
| JP | 2001030771 | A | 2/2001 |
| JP | (P) 2001-76751 | A | 3/2001 |
| JP | 2001143740 | | 5/2001 |
| JP | 2002235801 | A | 8/2002 |
| JP | 2002367852 | A | 12/2002 |
| WO | WO 96/20510 | | 9/1996 |

OTHER PUBLICATIONS

English Translation of German Office Action for Appln. No. 102 24 962.8-45, issued Mar. 9, 2005.

Japanese Language Version of Japanese Office Action, Appln. No. 2001-171442 dated Jun. 26, 2007.

English Translation of Japanese Office Action, Appln. No. 2001-171442 dated Jun. 26, 2007.

Japanese Language Version of Japanese Office Action, Appln. No. 2001-171442 dated Oct. 18, 2005.

English Translation of Japanese Office Action, Appln. No. 2001-171442 dated Oct. 18, 2005.

Japanese Language Version of Japanese Office Action, Appln. No. 2001-175510 dated Aug. 23, 2005.

English Translation of Japanese Office Action, Appln. No. 2001-175510 dated Aug. 23, 2005.

Japanese Language Version of Japanese Office Action, Appln. No. 2001-172121 dated Sep. 26, 2006.

English Translation of Japanese Office Action, Appln. No. 2001-172121 dated Sep. 26, 2006.

* cited by examiner

FUEL CELL MOUNTING STRUCTURE

Matter enclosed in heavy brackets [ ] appears in the original patent but forms no part of this reissue specification; matter printed in italics indicates the additions made by reissue.

INCORPORATION BY REFERENCE

The disclosure of Japanese Patent Application No. 2001-175510 filed on Jun. 11, 2001, No. 2001-172121 filed on Jun. 7, 2001 and No. 2001-171442 filed on Jun. 6, 2001 including the specification, drawings and abstract are incorporated herein by reference in their entirety.

BACKGROUND OF THE INVENTION

1. Field of the Invention

The invention relates to a fuel cell and, more particularly, to a housing case that forms an outside surface of a fuel cell.

2. Description of the Related Art

Research and development is now carried out on a vehicle equipped with a fuel cell electricity generating system capable of utilizing electricity generated during reaction between hydrogen and oxygen. Normally, fuel cells incorporated in a fuel cell electric power generating system are provided in the form of a fuel cell stack having many stacked unit cells. With regard to a fuel cell stack, a securing method has been proposed in which a fuel cell stack is secured by a pair of end plates that are disposed on both sides of the stack in the direction of stacking unit cells.

If a fuel cell having a fuel cell stack as mentioned above is installed in a vehicle, there arise dangers of positional deviation and deformation of stacked unit cells being caused by a torsional force applied to the fuel cell due to a torsion of a body of the vehicle or vibrations that occur in the vehicle. Such a slight deviation or deformation may cause leakage of a cooling gas, a fuel gas or the like. Furthermore, such a deviation or deformation will reduce the stability of the mounting fixture of the piping for supplying and discharging a fuel gas, an oxidative gas and a coolant, and the electric system wiring, etc. to the stack, and will reduce the mounting precision thereof. Considering stable installation of the fuel cell into a vehicle, the installation must be performed separately for each fuel cell stack, so the installation man-hours will increase.

SUMMARY OF THE INVENTION

It is an object of the invention to provide a fuel cell that is able to solve the aforementioned problems. More specifically, a major object of the invention is to prevent occurrence of torsion of a fuel cell stack disposed in a fuel cell housing case.

In order to achieve the aforementioned object, a fuel cell in accordance with an aspect of the invention includes: a fuel cell stack having a plurality of stacked unit cells and having a first electrode and a second electrode in two end portions of the fuel cell stack; a first end portion retaining member and a second end portion retaining member disposed in the two end portions of the fuel cell stack; and a fuel cell housing case that houses the fuel cell stack sandwiched by the first end portion retaining member and the second end portion retaining member and that retains the fuel cell stack by using a first retaining portion that retains a first end portion of a lower surface of the first end portion retaining member, a second retaining portion that retains a second end portion of the lower surface of the first end portion retaining member, and a third retaining portion that retains a central portion of a lower surface of the second end portion retaining member.

And a plurality of fuel cell stacks are provided in parallel, and the first end portion retaining member extends over the one end portions of the fuel cell stacks, and the second end portion retaining member extends over the other end portions of the fuel cell stacks.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 10 is an enlarged sectional view of end plate 124-adjacent portions of the cooling water channels formed in the fuel cell stack 122a;

DETAILED DESCRIPTION OF PREFERRED EMBODIMENTS

The invention will be described hereinafter with reference to preferred embodiments thereof.

(First Embodiment)

Figure 1:
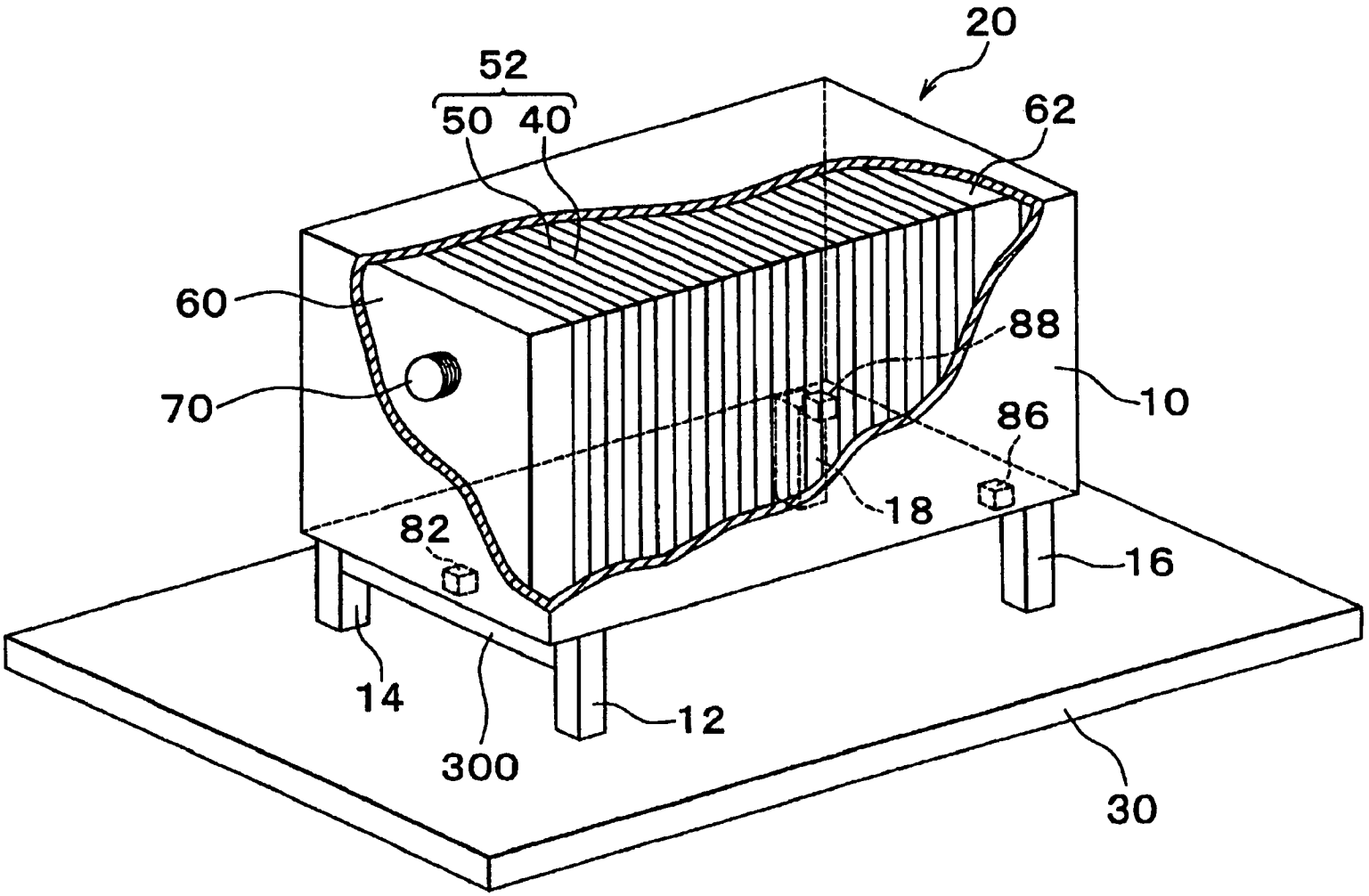
FIG. 1 is a schematic perspective view of a housing case 10 that houses a fuel cell 20 in accordance with a first embodiment of the invention.

FIG. 1 is a schematic perspective view of a fuel cell 20 in accordance with an embodiment of the invention. A housing case 10 is formed from a metal such as aluminum or the like, and is fixed to a vehicle body 30 via frames 12, 14, 16 and 18. The housing case 10 contains a fuel cell stack 52.

The fuel cell stack 52 is formed by stacking a plurality of unit cells 40 with separators 50 disposed therebetween. The fuel cell stack 52 is clamped from opposite sides by end plates 60, 62 that are formed from a metal, a resin or the like. Each unit cell 40 is made up of a polyelectrolyte film (e.g., a fluorocarbon based resin-formed ion exchange film having a thickness of 100 μm to 200 μm) and two electrodes (an anode and a cathode) sandwiching the polyelectrolyte film.

The end plate 60 is provided with a pressurizing mechanism 70 for pressurizing the fuel cell stack 52 from the two sides. In this embodiment, a pressurizing member that forms the pressurizing mechanism 70 is a bolt that extends through a through-hole of the end plate 60. By tightening the bolt, the stacked unit cells 40 are pressed. The end plate 62 may also be provided with a similar pressurizing mechanism.

Each unit cell 40 has a cooling water hole, a fuel gas hole, and an oxidative gas hole (not shown). When a plurality of unit cells 40 are stacked, these holes form passages for the cooling water, the fuel gas and the oxidative gas which extend through the stacked unit cells 40.

A reinforcement member 300 may be provided between the frames 12 and 14 of the housing case 10 (FIG. 1 shows a case provided with a reinforcement member 300). The reinforcement member 300 will be described later.

Figure 2A:
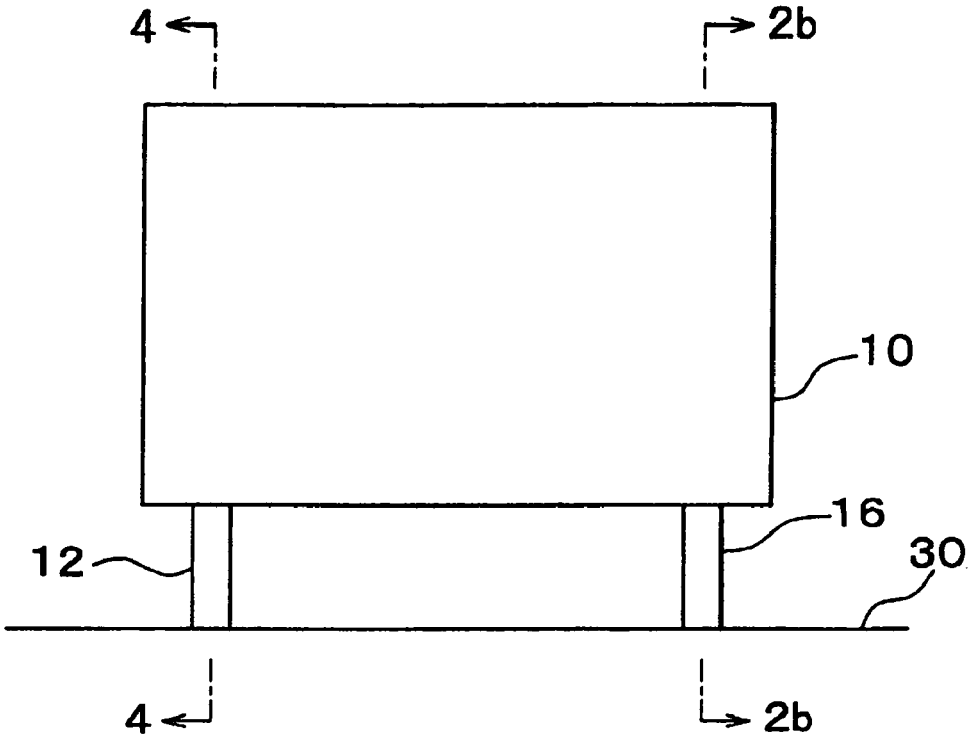
FIG. 2a is an elevation of the fuel cell 20.
Figure 2B:
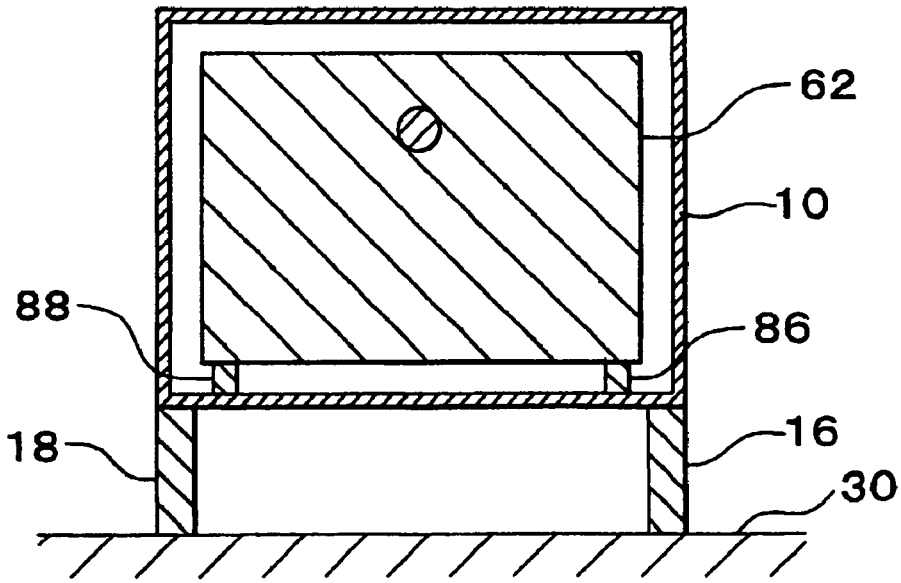
FIG. 2b is a sectional view of the fuel cell 20.

FIG. 2a is an elevation of the fuel cell 20. FIG. 2b is a sectional view of the housing case 10 that contains the fuel cell stack 52, the view being taken on line 2b-2b in FIG. 2a. As shown in FIG. 2b, the housing case 10 is fixed to the vehicle body 30 via the frames 16, 18. The end plate 62 of the fuel cell stack 52 is fixed, at opposite ends of a lower surface of the end plate 62, to the housing case 10 via mounts 86, 88.

Figure 3:
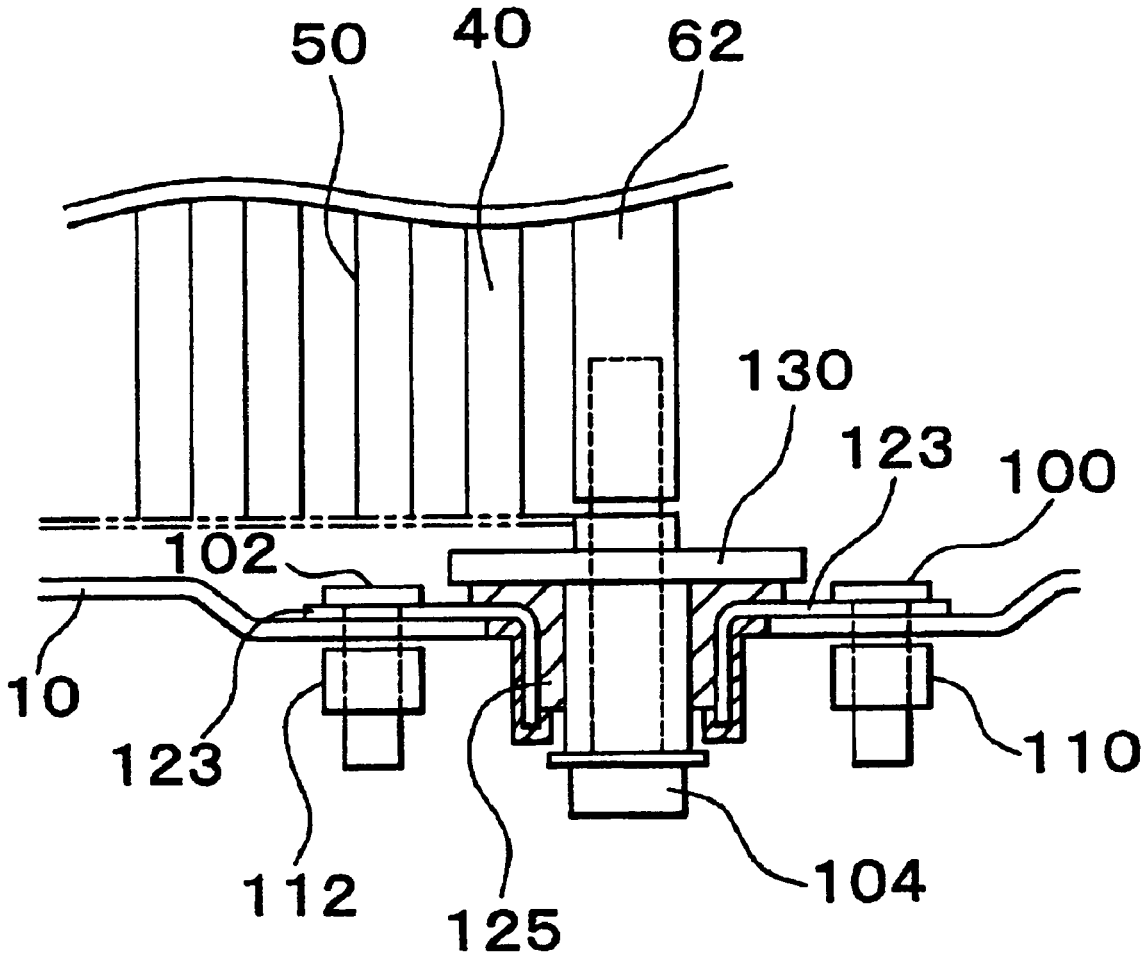
FIG. 3 is a sectional view of a structure of a mount 86.

FIG. 3 is a sectional view of the housing case 10 showing an example of the construction of the mounts 86, 88. A seat plate 123 is fixed to the housing case 10 via a bolt 100 and a nut 110. Similarly, a seat plate 123 is fixed to the housing case 10 via a bolt 102 and a nut 112. The end plate 62 is fastened to the seat plate 123 via a seat table 130 by tightening a bolt 104. An electrical insulator 125 is provided between the bolt 104 and the seat plate 123, so that the end plate 62 and the housing case 10 are electrically insulated from each other. An inner surface of the housing case 10 is coated with an insulating material (not shown). Thus, the insulation characteristic between the end plate 62 and the fuel cell 20 improves.

Figure 4:
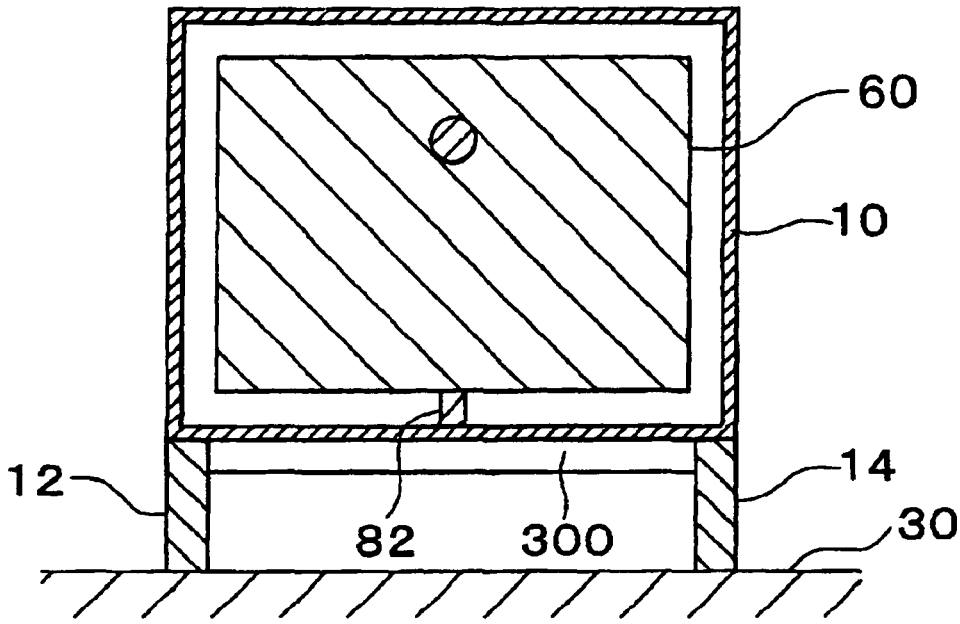
FIG. 4 is a sectional view of the fuel cell 20.

FIG. 4 is a sectional view of the housing case 10 that contains the fuel cell stack 52, the view being taken on a line 4-4 in FIG. 2a. In FIG. 4, the housing case 10 is fixed to the vehicle body 30 via the frames 12, 14. The end plate 60 of the fuel cell stack 52 is fixed, at a central portion of a lower surface of the end plate 60, to the housing case 10 via a mount 82. An example of the structure of the mount 82 may be the same as that of the mounts 86, 88.

As described above, the fuel cell stack 52 contained in the housing case 10 is fixed to the housing case 10 at the three sites, that is, the mounts 82, 86, 88. Therefore, a lower surface of the fuel cell stack 52 is determined over a triangular plane defined by the three points of the mounts 82, 86, 88. Hence, even if a torsion occurs in the vehicle body 30 or the housing case 10, the effect of the torsion on the fuel cell stack 52 can be avoided or reduced. Therefore, leakage of a gas caused by deviation of a unit cell 40 in the stack can be prevented. Furthermore, it also becomes possible to prevent the stability of the mounting fixture of the piping for supplying and discharging a fuel gas, an oxidative gas and a coolant, and the electric system wiring, etc. to the fuel cell stack and the mounting precision thereof from being reduced by a positional deviation of a stacked unit cell 40.

Figure 5:
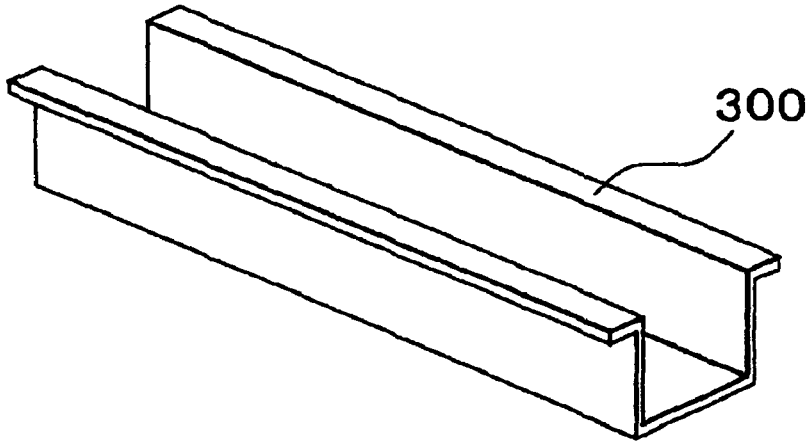
FIG. 5 is a perspective view of a specific example of the reinforcement member 300.
Figure 6:
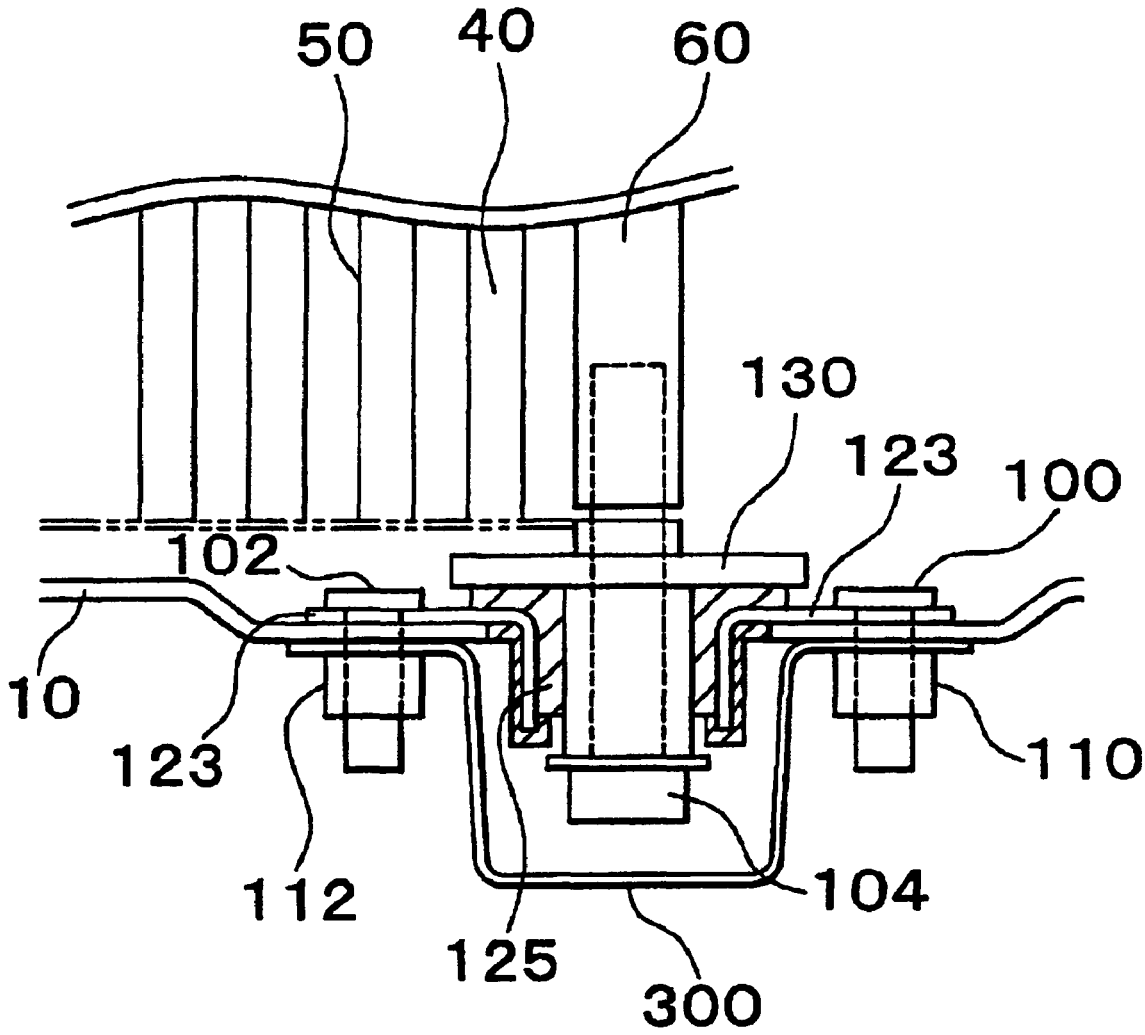
FIG. 6 is a sectional view of an example of the structure of a mount 82.

The fuel cell housing case in accordance with the invention may also have a reinforcement that reinforces a bottom surface portion which includes the position of the aforementioned third retaining portion and which extends in a direction perpendicular to the stacking direction. More specifically, a bottom surface portion of the housing case 10 where the mount 82 is positioned is preferably reinforced by, for example, the reinforcement member 300 having a structure as shown in FIG. 5. FIG. 6 shows a sectional view of the mount 82 that is reinforced by the reinforcement member 300. Due to the reinforcement employing the reinforcement member 300, the housing case 10 acquires a structure that withstands the load of the fuel cell stack 52 that concentrates on the site of the mount 82.

As can be understood from the above description, the invention is able to prevent occurrence of a deviation of a unit cell 40 in the stack of the fuel cell 20 even if a deviation occurs in the housing case 10 or the vehicle body 30.

(Second Embodiment)

Figure 7:
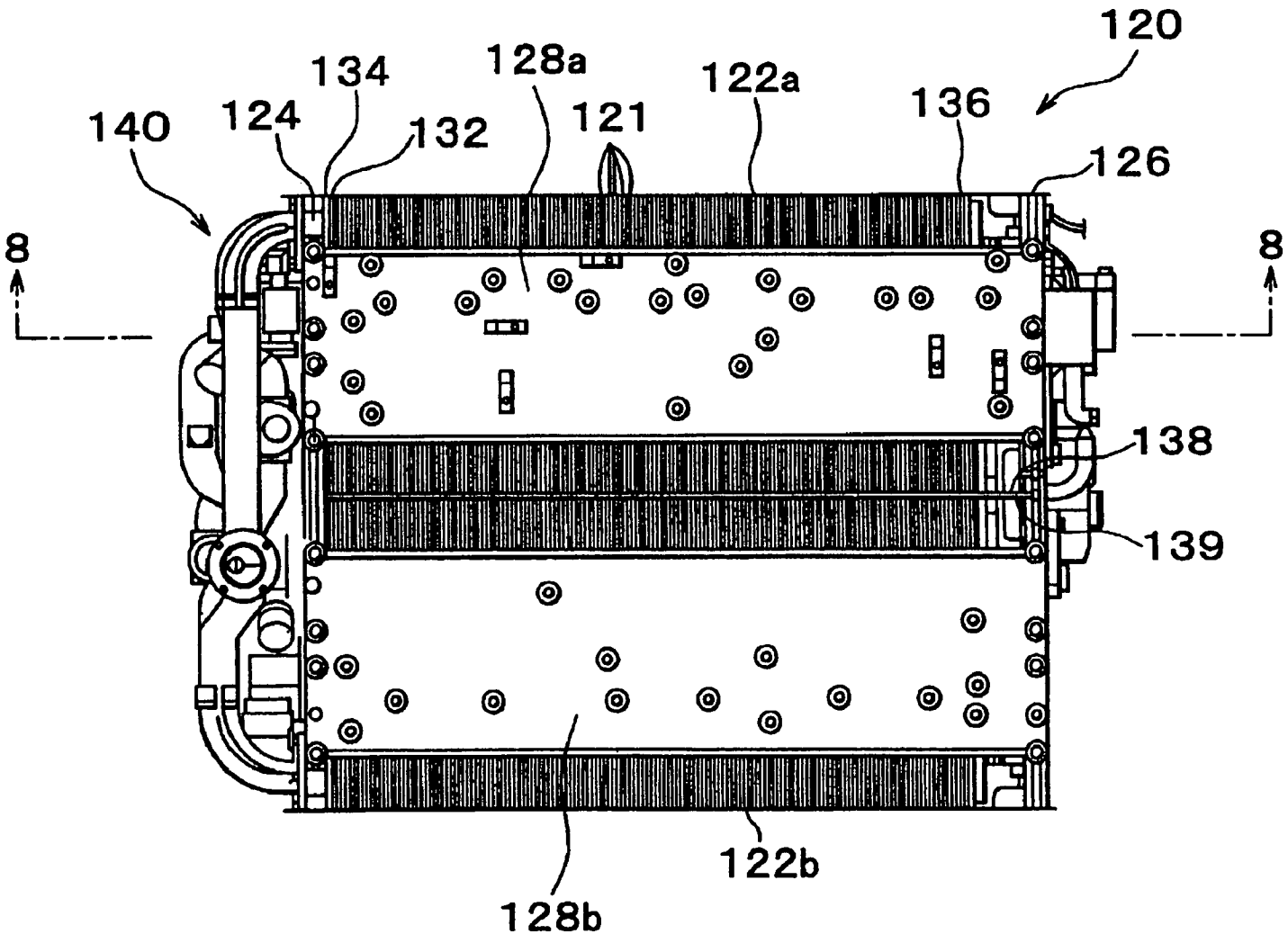
FIG. 7 is a schematic plan view of a fuel cell 120 in accordance with a second embodiment of the invention.
Figure 8:
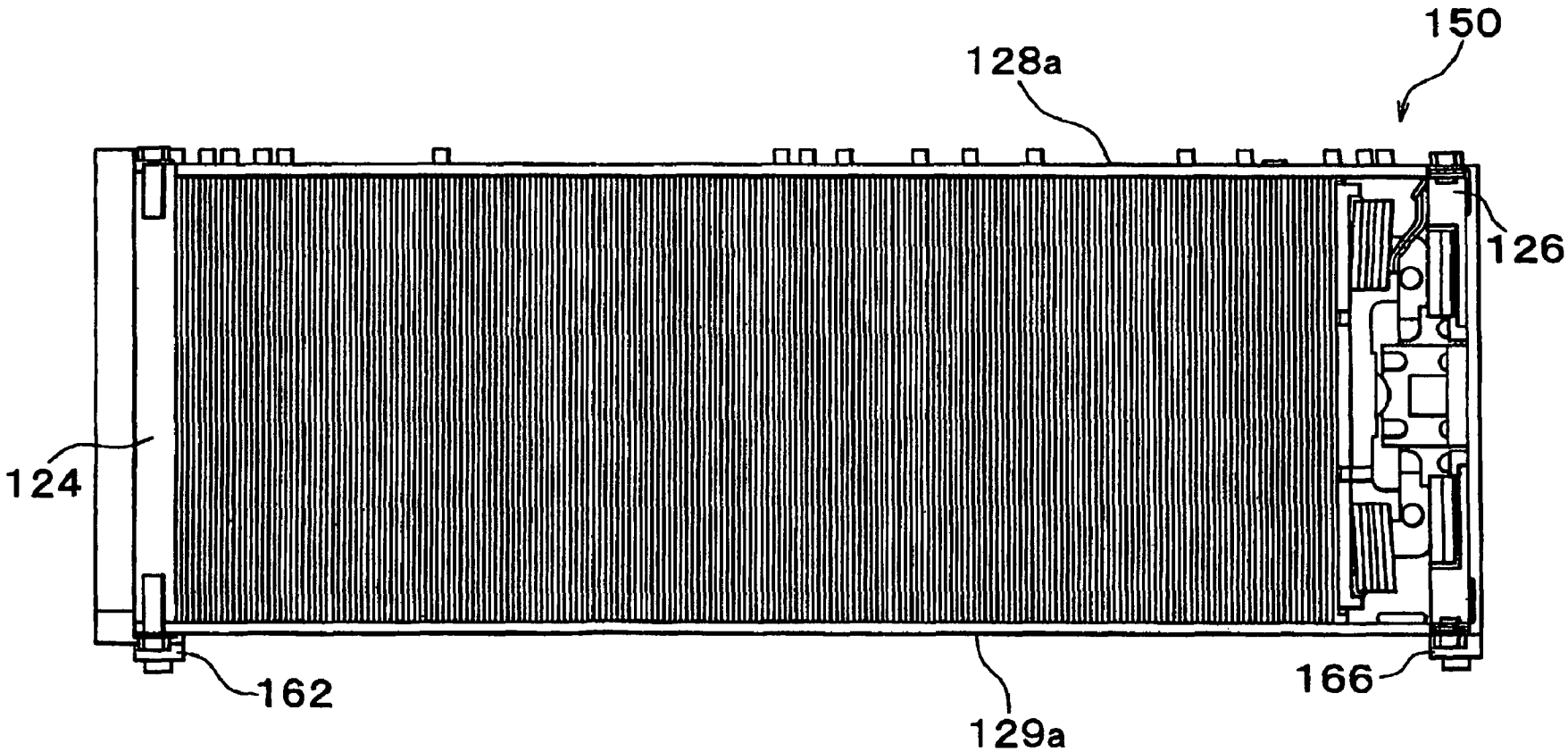
FIG. 8 is a sectional view of the fuel cell 120 shown in FIG. 7.

Now, a second embodiment of the invention will be described. FIG. 7 is a schematic plan view of a fuel cell 120 in accordance with an embodiment of the invention. FIG. 8 is a sectional view taken on a line 8-8 in FIG. 7. The fuel cell 120 has two rows of fuel cell stacks 122a, 122b, two end plates 124, 126, four tension plates 128a, 128b, 129a, 129b, a fuel-or-the-like supply/discharge piping 140, and a pressurizing mechanism 150. Each of the fuel cell stacks 122a, 122b is formed by stacking a plurality of unit cells 121. The end plates 124, 126 are disposed on opposite sides of the fuel cell stacks 122a, 122b and astride the two stacks. The tension plates 128a, 128b, 129a, 129b extend between the two end plates 124, 126 and over upper and lower surfaces of the fuel cell stacks 122a, 122b. The fuel-or-the-like supply/discharge piping 140 supplies and discharges hydrogen as a fuel, air as an oxidizer, and cooling water with respect to the two fuel cell stacks 122a, 122b. The pressurizing mechanism 150 applies pressure to the two fuel cell stacks 122a, 122b in the stacking direction.

The two fuel cell stacks 122a, 122b are electrically connected in series by a terminal plate 132 that is disposed at a side of the end plate 124. Similarly to the end plate 124, the terminal plate 132 lies astride the two fuel cell stacks 122a, 122b.

Electric power can be extracted from the fuel cell stacks 122a, 122b, via a plus-side output terminal 138 and a minus-side output terminal 139. The plus-side output terminal 138 is provided on an end plate 126-side end portion of the fuel cell stack 122a. The minus-side output terminal 139 is provided on an end plate 126-side end portion of the fuel cell stack 122b.

An insulator plate 134 formed from an electrically insulating material (e.g., a resin) is disposed between end plate 124 and the terminal plate 132. Thus, the end plate 124 and the terminal plate 132 are insulated from each other. Each of the end plate 124, the terminal plate 132 and the insulator plate 134 has six supply holes and six discharge holes. The supply holes supply hydrogen, air and cooling water to the two fuel cell stacks 122a, 122b. The discharge holes discharge hydrogen, air and cooling water from the two fuel cell stacks 122a, 122b.

Although not shown in the drawing, each of the fuel cell stacks 122a, 122b has six channels that extend therethrough in the stacking direction. The end plate 124-side channels are connected to twelve holes (six supply holes and six discharge holes) that are formed in the end plate 124, the terminal plate 132 and the insulator plate 134. Therefore, by connecting the fuel-or-the-like supply/discharge piping 140 to the six supply holes and the six discharge holes of the end plate 124, and by supplying hydrogen, air and cooling water, the two fuel cell stacks 122a, 122b generate electric power.

Figure 9:
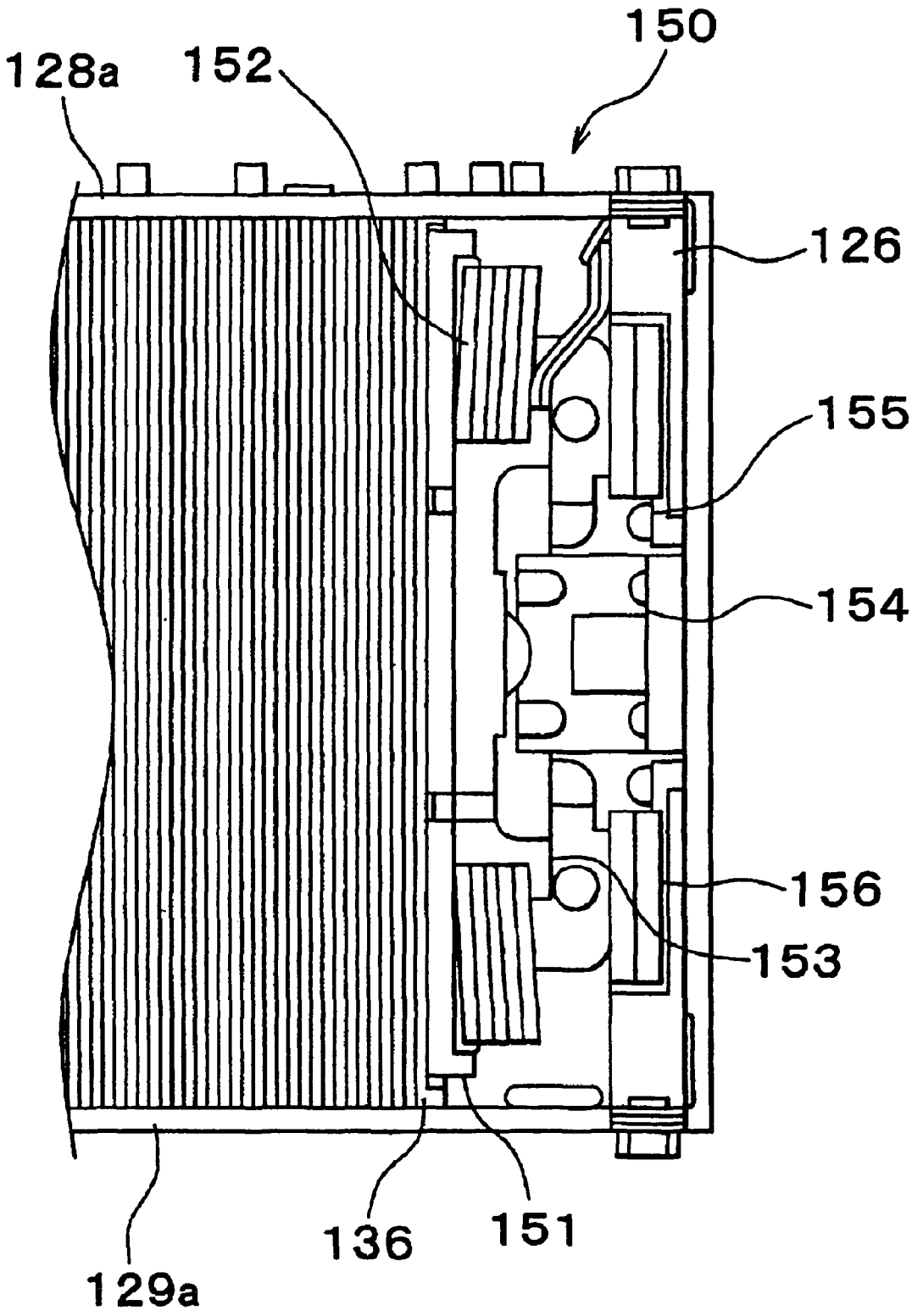
FIG. 9 is an enlarged view of an end plate 126-side pressurizing mechanism 150 of a fuel cell stack 122a and its adjacent portions.

FIG. 9 is an enlarged view of the end plate 126-side pressurizing mechanism 150 of the fuel cell stack 122a and its adjacent portions. As shown in FIG. 9, the pressurizing mechanism 150 is disposed between the end plate 126 and a insulator plate 136 disposed at an end of the fuel cell stack 122a. The pressurizing mechanism 150 is formed by a pressure exerting plate 151, a first dish spring 152, a force receiving upper member 153, a screw member 154, a stopper 155, and a second dish spring 156. The pressure exerting plate 151 exerts pressure on the fuel cell stack 122a via the insulator 136 in the stacking direction. The first dish spring 152 exerts force on the pressure exerting plate 151. The force receiving upper member 153 receives force opposite to the first dish spring 152. The screw member 154 receives force from the force receiving upper member 153 and adjusts the pressure on the fuel cell stack 122a. The stopper 155 receives force of the screw member 154. The second dish spring 156 is disposed between the stopper 155 and the end plate 126. A similar pressurizing mechanism 150 is disposed on the fuel cell stack 122b as well. In this construction, the dish springs 152, 156 are pressure exerting members.

As shown in FIG. 8, a mounting metal piece 162 is provided at a central site in a lower portion of the end plate 124, and two mounting metal pieces 164, 166 are provided at two sites on opposite end portion of a lower portion of the end plate 126. (In FIG. 8, the mounting metal piece 164 is hidden behind the mounting metal piece 166.)

The fuel cell 120 is mounted to the vehicle body at the three sites of the mounting metal pieces 162, 164, 166. Although in the second embodiment, the fuel cell 120 is mounted to the vehicle body via the three mounting metal pieces 162, 164, 166, the fuel cell 120 may also be mounted to the vehicle body via rubber mounts.

According to the above-described fuel cell 120 of the second embodiment, the two fuel cell stacks 122a, 122b are retained by disposing the two end plates 124, 126 on the opposite ends of the fuel cell stacks 122a, 122b and astride the two stacks. Therefore, the two fuel cell stacks 122a, 122b can be handled as a single unit. As a result, the stability of the mounting fixture of the fuel-or-the-like supply/discharge piping 140 and the mounting precision thereof can be improved.

Furthermore, in the second embodiment, the two fuel cell stacks 122a, 122b can be handled as one unit. Therefore, since the fuel cell 120 can be mounted to the vehicle body via the three fittings, that is, the mounting piece 162 provided on the end plate 124 and the mounting pieces 164, 166 provided on the end plate 126, this embodiment can reduce the man-hours for the mounting operation, in comparison with the case where fuel cell stacks are individually mounted to a vehicle body.

According to the fuel cell 120 of the second embodiment, the terminal plate 132 is disposed on the end plate 124 side so as to connect the two fuel cell stacks 122a, 122b in series, and the fuel-or-the-like supply/discharge piping 140 is provided on the end plate 124 side. Therefore, hydrogen, air and cooling water can be supplied and discharged at sites of equal electric potentials. As a result, it becomes possible to prevent the hydrolysis of water that can be caused by supplying water to sites of different electric potentials and to reduce electric loss. Due to the above-described arrangement, the output terminals 138, 139 of the fuel cell 120 can be provided at the end plate 126 side, which is opposite from the fuel-or-the-like supply/discharge piping 140. Therefore, the degree of freedom in designing the wirings for electric power can be increased. In the fuel cell in this aspect of the invention, positive and negative output terminals for supplying electric power may be disposed at a side of one of the two end portion retaining members.

According to the fuel cell 120 of the second embodiment, the fuel-or-the-like supply/discharge piping 140 is provided at the end plate 124 side, and the pressurizing mechanism 150 is provided at the opposite side, that is, the end plate 126 side. Therefore, it is no longer necessary to consider the displacement of the stack caused by, for example, adjustment of the pressure exerted on the fuel cell stacks 122a, 122b with respect to the mounting of the fuel-or-the-like supply/discharge piping 140. As a result, the mounting characteristic of the fuel-or-the-like supply/discharge piping 140 can be improved, and the sealing characteristic regarding hydrogen, air and cooling water can be secured without a need to adopt a complicated construction.

Figure 10:
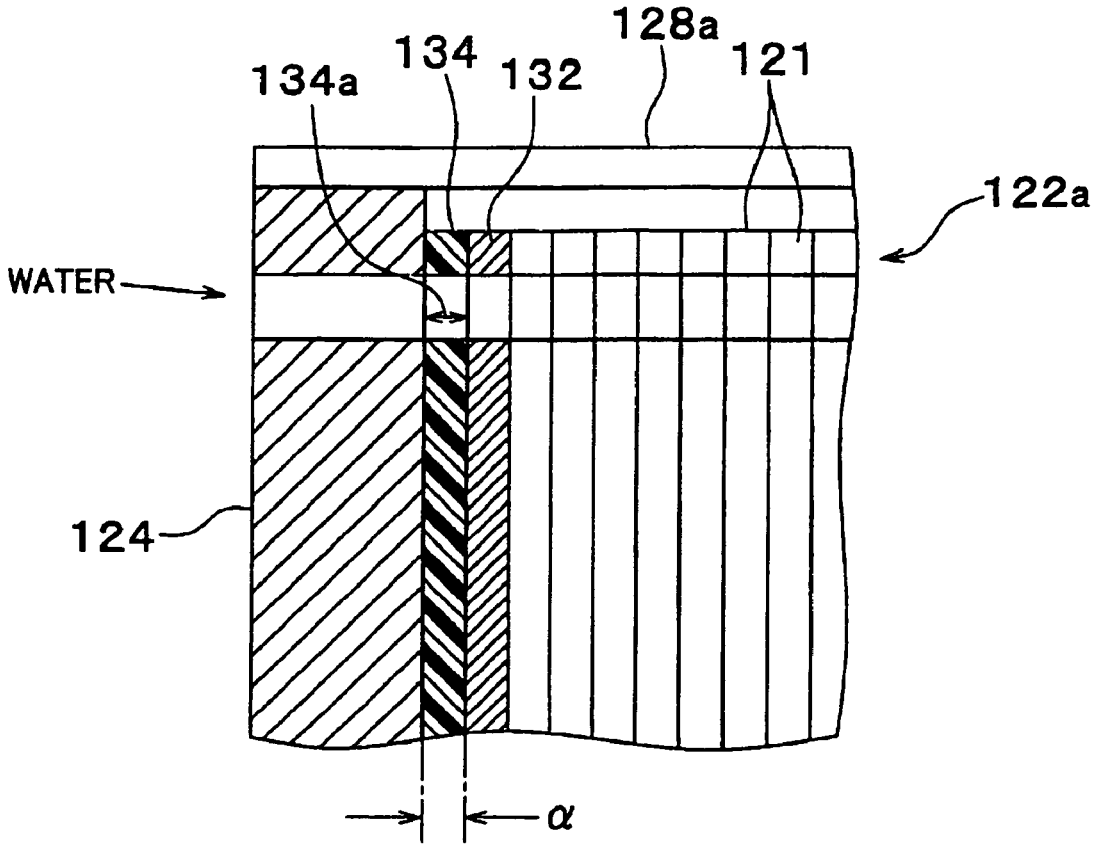

FIG. 10 is an enlarged sectional view of end plate 124-adjacent portions of the cooling water channels formed in the fuel cell stack 122a. As described above, the terminal plate 132 and the insulator plate 134 are disposed between the end plate 124 and the adjacent unit cell 121 in an end plate 124-side end portion of the fuel cell stack 122a. The insulator 134 has such a thickness a that the electric current that flows through a signal line of a sensor provided in the fuel cell stack 122a (e.g., a signal line for detecting the voltage of a unit cell) at the time of a formation of short circuit that includes, as portions of the short circuit, the signal line and water present in a channel 134a of the insulator 134 is within a range of electric current that does not break the signal line.

Figure 11:
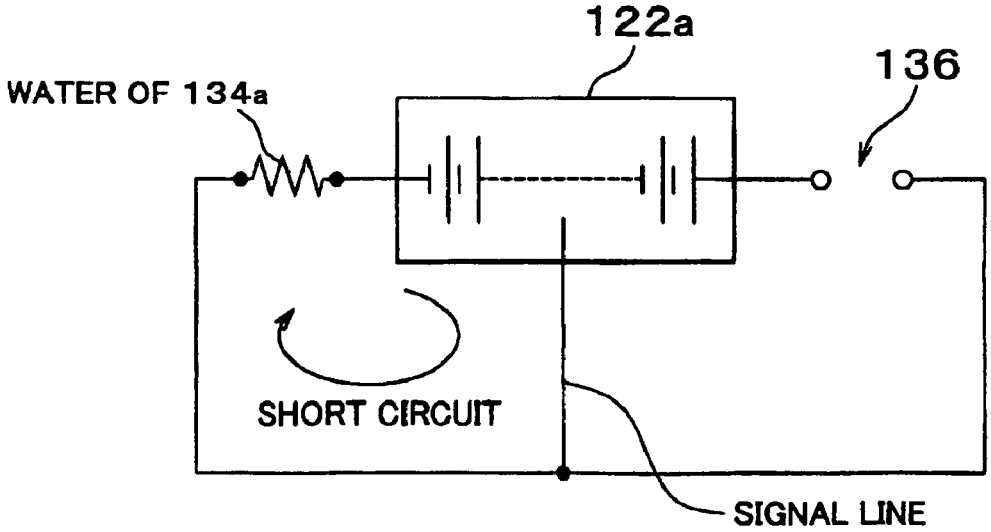
FIG. 11 is a circuit diagram that electrically illustrates a short circuit.

FIG. 11 is a circuit diagram that electrically illustrates a short circuit. Normally, the fuel cell stack 122a is electrically insulated by the insulator 136 disposed at the end plate 126 side. A case where the fuel cell stack 122a has a short circuit formed by a signal line connected to the fuel cell stack, the tension plate 128a, and the cooling water present in the channel 134a of the insulator 134 will now be considered. The electric current through the signal line is determined by the value of resistance of the cooling water in the channel 134a of the insulator 134. The value of resistance is determined by the length of the channel 134a, that is, the thickness $\alpha$ of the insulator 134. In the fuel cell 120 of the embodiment, breakage of the signal line caused by short-circuit current is prevented by forming an insulator 134 having a thickness of at least 3 mm based on experiments or the like. The thickness $\alpha$ of the insulator 134 is determined by the material and the sectional area of the signal line used, the property of the cooling water, etc.

In the fuel cell 120 of the second embodiment, the insulator 134 formed from an electrically insulating material as a plate member having a certain thickness that is determined by a signal line of a sensor or the like attached to the fuel cell stack is disposed at the side of the end plate 124 where the fuel-or-the-like supply/discharge piping 140 is connected. Therefore, even if a short circuit that includes the signal line as a portion thereof is formed, breakage of the signal line is prevented.

Although in the fuel cell 120 of the second embodiment, the two end plates 124, 126 are disposed at the opposite ends of the two fuel cell stacks 122a, 122b and astride the two stacks, it is also possible to dispose two end plates at opposite ends of more than two fuel cell stacks, for example, four stacks, six stacks, etc. so that the end plates extend over the ends of all the stacks.

Although the fuel cell 120 of the second embodiment is described above on the assumption that the fuel cell 120 is installed in a vehicle, it is not necessary to install the fuel cell 120 in a vehicle.

(Third Embodiment)

In the first and second embodiments, positional deviation of a fuel cell stack is prevented by making it less likely that vibration or deformation of a body of the vehicle where the fuel cell is installed is transferred to the fuel cell stack. Thus, gas leakage is prevented. Countermeasures to be taken if a fuel gas leaks from a fuel cell stack due to a positional deviation will be described below as third and fourth embodiments.

A fuel cell stack for use in vehicles is normally sealed by a seal member so that there is no leakage of hydrogen as a fuel gas, air as an oxidizer, or cooling water from the fuel cell stack, except for slight penetration of hydrogen, air or cooling water via a seal member. The fuel cell stack is contained in a tightly sealed case in order to prevent entrance of rainwater or the like from outside and prevent the imparting of an electrical shock to a person or the like.

No problem is caused by the slight penetration of air or cooling water through the seal member caused by deviation or deformation of a fuel cell stack caused by vibrations or torsion transmitted from the vehicle body to the fuel cell. However, as for the hydrogen passed through the seal member, there is a need for release from the housing case to the outside, considering the flammability thereof.

The seal member for preventing leakage of hydrogen or air normally undergoes aging during use. In some cases, hydrogen or air leaks from a fuel cell stack. If this happens, it becomes necessary to release hydrogen from the case to the outside. Furthermore, if hydrogen leaks from a fuel cell stack, there arises a need for a countermeasure against a rapid pressure rise in the fuel cell stack-housing case caused by ignition of hydrogen leak.

Figure 12:
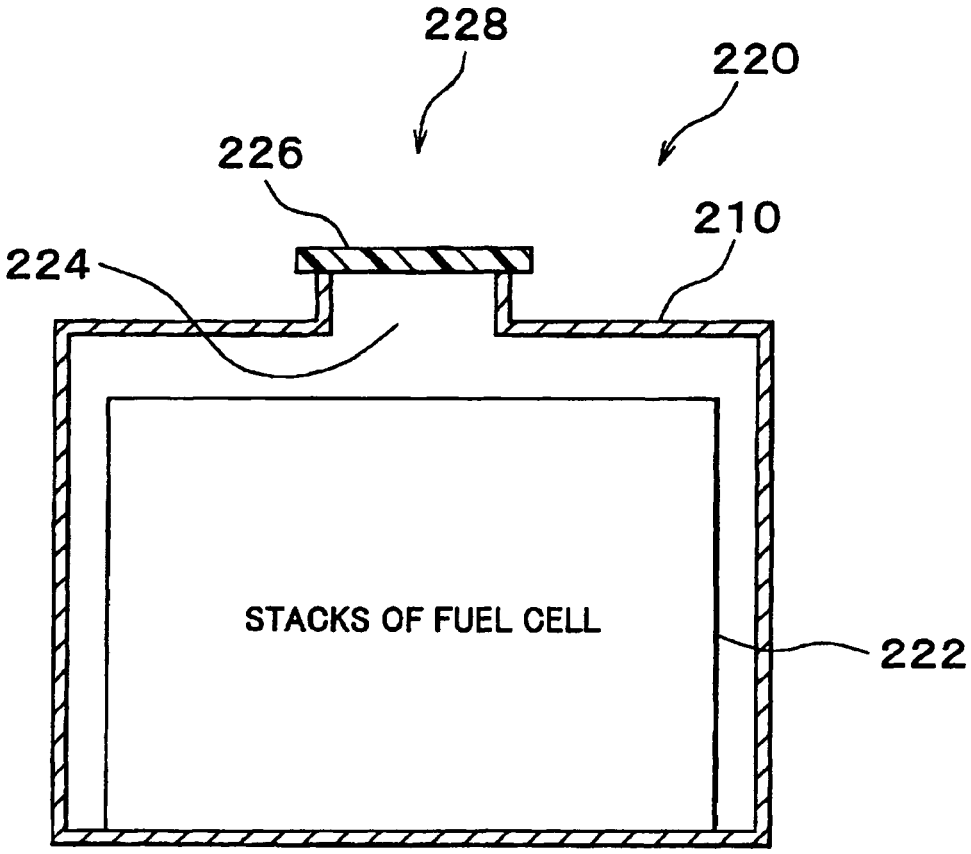
FIG. 12 is a diagram schematically illustrating a construction of a fuel cell 220 in accordance with a third embodiment of the invention.

FIG. 12 is a diagram schematically illustrating a construction of a fuel cell 220 in accordance with the third embodiment of the invention. A housing case 210 in this embodiment has, in its uppermost portion, a ventilation portion 228 that has a ventilating opening 224 and a hydrogen-permeable membrane 226 that seals the ventilating opening 224. The entire housing case 210, except the ventilation portion 228, is sealed so as to completely seal the enclosed fuel cell stack 222 from the outside.

The hydrogen-permeable membrane 226 is formed from a material that allows permeation of gases such as hydrogen, air, etc., but does not allow permeation of water, for example, a porous material.

Assuming for illustration purposes that a small amount of hydrogen as a fuel passes through a seal member from the fuel cell stack 222 contained in the housing case 210 of the third embodiment, or that hydrogen leaks due to deterioration of the seal member, hydrogen from the fuel cell stack 222 diffuses into the housing case 210, and gathers in the ventilation portion 228 provided in an uppermost portion of the housing case 210 because hydrogen is lighter than air. The hydrogen gathering in the ventilation portion 228 permeates through the hydrogen-permeable membrane 226, and is thus discharged out of the housing case 210.

According to the fuel cell 220 of the third embodiment, the small amount of hydrogen penetrating the seal member of the fuel cell stack 222 and the amount of hydrogen leaking from the fuel cell stack 222 is discharged via the ventilation portion 228. Therefore, rise of hydrogen concentration in the housing case 210 can be curbed. Furthermore, since the ventilation portion 228 is provided in an uppermost portion of the housing case 210, the hydrogen ventilation efficiency can be improved.

In the fuel cell 220 of the third embodiment, the ventilation portion 228 is provided in an uppermost portion of the housing case 210. However, the ventilation portion 228 does not need to be located in an uppermost portion as long as the ventilation portion 228 is provided in an upper portion of the housing case 210 and allows ventilation of the housing case 210. Although in the fuel cell 220 of the third embodiment, only one ventilation portion 228 is provided in the uppermost portion of the housing case 210, it is also possible to provide a plurality of ventilation portions.

(Fourth Embodiment)

Figure 13:
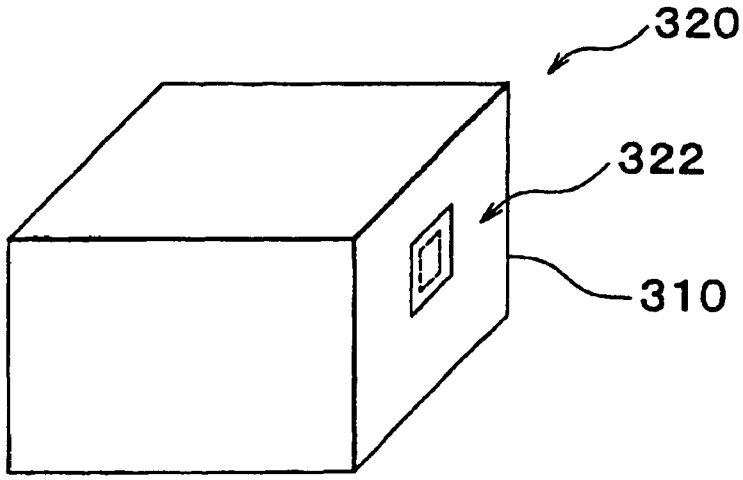
FIG. 13 is a diagram schematically illustrating a construction of a fuel cell 320 in accordance with a fourth embodiment.
Figure 14A:
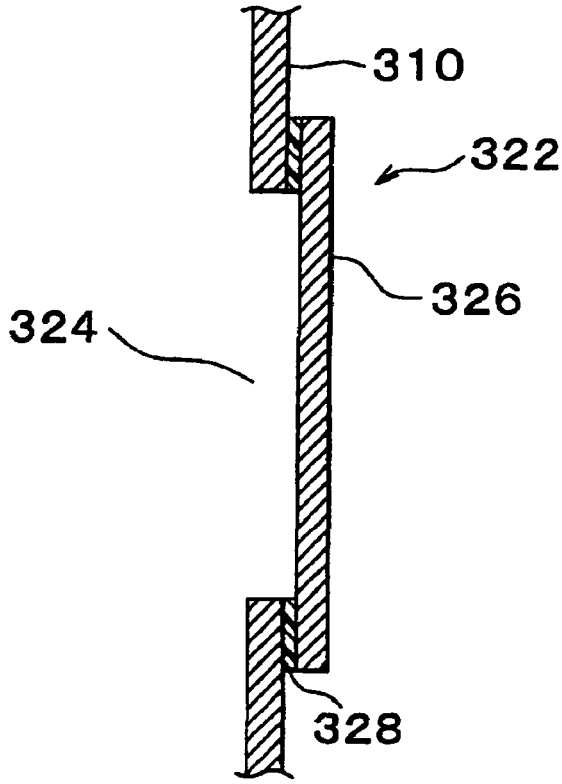
FIG. 14a is a plan view of the fuel cell 320.
Figure 14B:
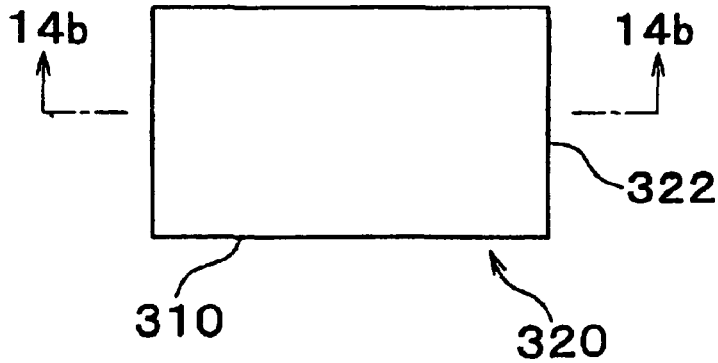
FIG. 14b is an enlarged sectional view.

Next described will be a fuel cell 320 of a fourth embodiment of the invention. FIG. 13 is a diagram schematically illustrating a construction of the fuel cell 320 of the fourth embodiment. FIG. 14a is a plan view of the fuel cell 320. FIG. 14b is an enlarged sectional view taken on line 14b-14b in FIG. 14a. In the fuel cell 320 of the fourth embodiment, a pressure release portion 322 formed by sealing a pressure release hole 324 with a pressure release lid 326 via a double-sided adhesive tape 328 having a predetermined adhesion strength is provided in a case-side portion. At the site of the pressure release portion 322 as well, sealing is accomplished so that an enclosed fuel cell stack (not shown) is completely sealed from outside.

The area of opening of the pressure release hole 324 is calculated so that when a predetermined pressure (e.g., 6 kPaG) less than or equal to the breaking pressure of the case occurs, the force that acts on the pressure release lid 326 overcomes the adhesion strength of the double-sided adhesive tape 328. This predetermined pressure is set by the material of the case or the like.

Next considered will be a case where hydrogen leaks from the fuel cell stack provided in the fuel cell 320 of the fourth embodiment constructed as described above, and is ignited for a certain cause. Hydrogen, when ignited in the presence of oxygen, burns in an explosive manner. At the time of such an explosive combustion, pressure in the housing case 310 sharply increases. When the internal pressure of the housing case 310 reaches a predetermined pressure, the force acting on the pressure release lid 326 based on the internal pressure of the housing case 310 overcomes the adhesion strength of the double-sided adhesive tape 328. Therefore, the pressure inside the housing case 310 is kept below a predetermined pressure. The predetermined pressure is set at or below the breaking pressure of the housing case 310. Hence, it is possible to prevent breakage of the housing case 310 caused by an abnormal pressure rise even if hydrogen should explosively burns. The pressure value (predetermined pressure) for releasing pressure at the pressure release portion 322 may be determined by the adhesion strength of the double-sided adhesive tape 328 and the area of opening of the pressure release hole 324.

According to the fuel cell 320 of the fourth embodiment, provision of the pressure release portion 322 prevents the internal pressure of the housing case 310 from becoming abnormally high. As a result, it becomes possible to prevent breakage of the housing case 310 due to abnormal pressure rise.

Although in the fuel cell 320 of the fourth embodiment, the pressure release lid 326 is adhered via the double-sided adhesive tape 328 so as to seal the pressure release hole 324, the double-sided adhesive tape 328 may be replaced by a seal member and the pressure release lid 326 may be attached to the pressure release hole 324 by using bolts. In this case, it is appropriate to adopt an arrangement in which when the force based on a predetermined pressure acts on the pressure release lid 326, the internal gas is released overcoming the bolt fastening strength.

Although in the fuel cell 320 of the fourth embodiment, the pressure release portion 322 is provided in a side surface of the housing case 310, the pressure release portion 322 may be provided in an upper surface or a lower surface of the housing case 310. Furthermore, although in the housing case 310 of the fourth embodiment, only one pressure release portion 322 is provided, it is also possible to provide a plurality of pressure release portions.

Although the fuel cell 220 of the third embodiment and the fuel cell 320 of the fourth embodiment are separately described, it is also appropriate to provide a fuel cell equipped with a housing case that has a ventilation portion 228 described in conjunction with the fuel cell 220 of the third embodiment and a pressure release portion 322 described in conjunction with the fuel cell 320 of the fourth embodiment.

The fuel cell 220 of the third embodiment and the fuel cell 320 of the fourth embodiment have been separately described. Technical ideas that can be grasped from the embodiments will be mentioned below.

A fuel cell including a housing case that has a gas-permeable portion that allows permeation of gas but does not allow permeation of liquid.

In the fuel cells equipped with housing cases as described above, the gas-permeable portion allows permeation of gas but does not allow permeation of liquid. That is, the gas-permeable portion allows permeation of gas while preventing entrance of a liquid such as rainwater or the like. Therefore, the internal space of the housing case can be ventilated.

A housing case-equipped fuel cell wherein the aforementioned gas-permeable portion is a hydrogen-permeable portion that does not allow permeation of water but allows permeation of at least hydrogen.

A housing case-equipped fuel cell wherein the aforementioned hydrogen-permeable portion has a through-hole formed in the housing case and a hydrogen-permeable membrane that seals the through-hole.

In the housing case-equipped fuel cells described above, at least hydrogen can be released from the housing case to the outside.

A housing case-equipped fuel cell wherein the gas-permeable portion is formed in an upper portion of the housing case.

In this housing case-equipped fuel cell, hydrogen, which is lighter than air, can be passed in an increased amount to the outside, so that the ventilation efficiency can be improved.

A fuel cell including a housing case that houses a fuel cell stack and that has a pressure release portion that releases pressure from the housing case when the pressure in the housing case reaches a predetermined pressure.

In this housing case-equipped fuel cell, the pressure release portion releases pressure when the pressure in the housing case reaches the predetermined pressure. Therefore, it is possible to prevent abnormal pressure in the housing case.

A housing case-equipped fuel cell wherein the pressure release portion has a through-hole that is formed in the housing case and that has a predetermined area, and a seal member that seals the through-hole with a predetermined adhesion strength.

A housing case-equipped fuel cell wherein the predetermined area is an area that causes a force that overcomes the predetermined adhesion strength when the predetermined pressure acts thereon.

In this housing case-equipped fuel cell, if the air pressure in the housing case reaches or exceeds a predetermined value, gas can be discharged via the pressure release portion.

While the invention has been described with reference to what are presently considered to be preferred embodiments thereof, it is to be understood that the invention is not limited to the disclosed embodiments or constructions. To the contrary, the invention can also be carried out in various other manners without departing from the sprit of the invention.

What is claimed is:

[1. A fuel cell assembly comprising:

a fuel cell stack having a plurality of stacked unit cells and having a first electrode in a first end portion of the fuel cell stack and a second electrode in a second end portion which is opposite side of the first end portion of the fuel cell stack;

a first end portion retaining member having a first retaining portion in a first end portion of a lower surface of the first end portion retaining member and having a second retaining portion in a second end portion of the lower surface of the first end portion retaining member, and which is directly or indirectly fixed to one end portion of the fuel cell stack;

a second end portion retaining member having a third retaining portion in a central portion of a lower surface of the second end portion retaining member, and which is directly or indirectly fixed to the other end portion of the fuel cell stack; and a fuel cell housing case that houses the fuel cell stack sandwiched by the first end portion retaining member and the second end portion retaining member, the fuel cell stack being fixed to the fuel cell housing case via the first retaining portion, the second retaining portion and the third retaining portion.]

[2. The fuel cell assembly according to claim 1, further comprising a reinforcing member that reinforces a bottom surface portion which includes a position of the third retaining portion and which extends perpendicularly to a stacking direction of the unit cells.]

[3. The fuel cell assembly according to claim 1, wherein the first end portion retaining member and the second end portion retaining member are plate members.]

[4. The fuel cell assembly according to claim 1, wherein the first end portion retaining member and the second end portion retaining member have a mounting portion respectively for installation in a vehicle body.]

[5. A fuel cell assembly comprising:

a plurality of fuel cell stacks having a plurality of stacked unit cells and having a first electrode in a first end portion of the fuel cell stack and a second electrode in a second end portion which is opposite side of the first end portion of the fuel cell stack, and which are provided in parallel each other;

a first end portion retaining member having a first retaining portion in a first end portion of a lower surface of the first end portion retaining member and having a second retaining portion in a second end portion of the lower surface of the first end portion retaining member, and which is directly or indirectly fixed to one end portion of the fuel cell stack and extends over the one end portions of the fuel cell stacks, a second end portion retaining member having a third retaining portion in a central portion of a lower surface of the second end portion retaining member, and which is directly or indirectly fixed to the other end portion of the fuel cell stack and extends over the other end portions of the fuel cell stacks; and a fuel cell housing case that houses the fuel cell stack sandwiched by the first end portion retaining member and the second end portion retaining member, the fuel cell stack being fixed to the fuel cell housing case via the first retaining portion, the second retaining portion and the third retaining portion.]

[6. The fuel cell assembly according to claim 5, further comprising a fluid supply/discharge portion that supplies and discharges a fluid with respect to the fuel cell stacks, and which is provided in one of the first end portion retaining member and the second end portion retaining member.]

[7. The fuel cell assembly according to claim 6, wherein the fluid supply/discharge portion comprises:

a first fuel supply/discharge portion that supplies and discharges a first fuel with respect to a first electrode side;

a second fuel supply/discharge portion that supplies and discharges a second fuel with respect to a second electrode side, and a coolant supply/discharge portion that supplies and discharges a coolant for cooling the fuel cell stacks.]

[8. The fuel cell assembly according to claim 6, further comprising an insulating member that is formed with an electrically insulating material as a plate member having a predetermined thickness, and that is disposed between one of the first end portion retaining member and the second end portion retaining member and the fuel cell stacks.]

[9. The fuel cell assembly according to claim 8, further comprising a voltage detecting sensor, wherein the fluid supply/discharge portion has a water supply/discharge portion that supplies and discharges a water, and wherein the predetermined thickness is such a thickness that, when the fuel cell has a short circuit that includes as portions thereof a signal line of the sensor connected to the fuel cell stacks and the water present in a water supply/discharge passage provided in the insulating member, the insulating member keeps an electric current that flows through the signal line to within a range of current such that the signal line is not broken.]

[10. The fuel cell assembly according to claim 8, wherein the predetermined thickness is at least 3 mm.]

[11. The fuel cell assembly according to claim 6, further comprising a pressure exerting member that is disposed inwardly of the second end portion retaining member and that exerts a pressure in the stacking direction on each of the fuel cell stacks.]

[12. The fuel cell assembly according to claim 11, wherein the pressure exerting member includes a plurality of coned disc springs.]

[13. The fuel cell assembly according to claim 11, wherein the pressure exerting member includes bolts that extend through the fuel cell stacks.]

[14. The fuel cell assembly according to claim 5, further comprising a series connecting member that is formed into a plate shape from an electrically conductive material and connects electrically plurality of adjacent fuel cell stacks in series.]

[15. The fuel cell assembly according to claim 14, wherein the plurality of fuel cell stacks are two fuel cell stacks, and the series connecting member is disposed inwardly of the first end portion retaining member and connects a first end portion of a first fuel cell stack and a second end portion of a second fuel cell stack adjacent to the first fuel cell stack.]

[16. The fuel cell assembly according to claim 15, further comprising a positive output terminal and a negative output terminal that are disposed on the second end portion retaining member.]

[17. The fuel cell assembly according to claim 14, wherein the plurality of fuel cell stacks are more than three fuel cell stacks, and a first series connecting member disposed inwardly of the first end portion retaining member connects the first end portion of one fuel cell stack and the second end portion of one adjacent fuel cell stack, and a second series connecting member disposed inwardly of the second end portion retaining member connects the second end portion of the one fuel cell stack and the first end portion of the another adjacent fuel cell stack.]

[18. A fuel cell assembly comprising:

a fuel cell stack having a plurality of stacked unit cells and having a first electrode in a first end portion of the fuel cell stack and a second electrode in a second end portion which is opposite side of the first end portion of the fuel cell stack;

a first end portion retaining member having a first retaining portion in a first end portion of a lower surface of the first end portion retaining member and having a second retaining portion in a second end portion of the lower surface of the first end portion retaining member, and which is directly or indirectly fixed to one end portion of the fuel cell stack;

a second end portion retaining member having a third retaining portion in a central portion of a lower surface of the second end portion retaining member, and which is directly or indirectly fixed to the other end portion of the fuel cell stack; and a supporting member fixed to the fuel cell stack via the first retaining portion, the second retaining portion and the third retaining portion, the fuel cell stack being sandwiched by the first end portion retaining member and the second end portion retaining member.]

*19. A fuel cell assembly comprising:*

*at least one fuel cell stack having a plurality of stacked unit cells and a lower surface; and*

*end plates clamping the at least one fuel cell stack;*

*wherein one end plate of the end plates is supported at two points by first and second mounts, while another end plate of the end plates is supported at one single point by a third mount, and*

*wherein each of the first, second, and third mounts extends vertically downward from the lower surface of the fuel cell stack.*

*20. The fuel cell assembly according to claim 19, further comprising a reinforcing member that reinforces a bottom surface portion which includes a position of the one single point and which extends perpendicularly to a stacking direction of the unit cells.*

*21. The fuel cell assembly according to claim 19, wherein the end plates have a mounting portion respectively for installation in a vehicle body.*

*22. The fuel cell assembly according to claim 19, further comprising a fluid supply/discharge portion that supplies and discharges a fluid with respect to the at least one fuel cell stack, and which is provided in one of the end plates.*

*23. The fuel cell assembly according to claim 22, wherein the fluid supply/discharge portion comprises: a first fuel supply/discharge portion that supplies and discharges a first fuel with respect to a first electrode side; a second fuel supply/discharge portion that supplies and discharges a second fuel with respect to a second electrode side, and a coolant supply/discharge portion that supplies and discharges a coolant for cooling the at least one fuel cell stack.*

*24. The fuel cell assembly according to claim 22, further comprising an insulating member that is formed with an electrically insulating material as a plate member having a predetermined thickness, and that is disposed between one of the end plates and the at least one fuel cell stack.*

*25. The fuel cell assembly according to claim 24, further comprising a voltage detecting sensor, wherein the fluid supply/discharge portion has a water supply/discharge portion that supplies and discharges a water, and wherein the predetermined thickness is such a thickness that, when the fuel cell*

*has a short circuit that includes as portions thereof a signal line of the sensor connected to the fuel cell stacks and the water present in a water supply/discharge passage provided in the insulating member, the insulating member keeps an electric current that flows through the signal line to within a range of current such that the signal line is not broken.*

*26. The fuel cell assembly according to claim 24, wherein the predetermined thickness is at least 3 mm.*

*27. The fuel cell assembly according to claim 22, further comprising a pressure exerting member that is disposed at an end plate and that exerts a pressure in the stacking direction on the at least one fuel cell stack.*

*28. The fuel cell assembly according to claim 27, wherein the pressure exerting member includes a plurality of coned disc springs.*

*29. The fuel cell assembly according to claim 27, wherein the pressure exerting member includes a bolt.*

*30. The fuel cell assembly according to claim 27, wherein the pressure exerting member is disposed at the end plate supported at one single point.*

*31. The fuel cell assembly according to claim 27, wherein the pressure exerting member is disposed at the end plate supported at two points.*

*32. The fuel cell assembly according to claim 19, further comprising a series connecting member that is formed into a plate shape from an electrically conductive material and electrically connects a plurality of adjacent fuel cell stacks in series.*

*33. The fuel cell assembly according to claim 32, wherein the plurality of fuel cell stacks are two fuel cell stacks, and the series connecting member is disposed inwardly of an end plate and connects a first end portion of a first fuel cell stack and a second end portion of a second fuel cell stack adjacent to the first fuel cell stack.*

*34. The fuel cell assembly according to claim 33, wherein the series connecting member is disposed at the end plate supported at one single point.*

*35. The fuel cell assembly according to claim 33, wherein the series connecting member is disposed at the end plate supported at two points.*

*36. The fuel cell assembly according to claim 33, further comprising a positive output terminal and a negative output terminal that are disposed on the end plate supported at the one single point.*

*37. The fuel cell assembly according to claim 32, wherein the plurality of fuel cell stacks are more than three fuel cell stacks, and a first series connecting member disposed inwardly of the end plate supported at two points connects a first end portion of one fuel cell stack and the second end portion of one adjacent fuel cell stack, and a second series connecting member disposed inwardly of the end plate supported at the one single point connects a second end portion of the one fuel cell stack and the first end portion of the another adjacent fuel cell stack.*

*38. A fuel cell assembly comprising:*

*a fuel cell stack having a lower surface;*

*end plates to retain the fuel cell stack; and*

*a support system applied to the end plates at three points and no more than three points,*

*wherein the support system includes first, second, and third mounts, and*

*wherein each of the first, second, and third mounts extends vertically downward from the lower surface of the fuel cell stack.*

*39. The fuel cell assembly of claim 38, wherein the support system comprises a first mount associated with a first end plate, and second and third mounts associated with a second end plate.*

*40. The fuel cell assembly of claim 38, further comprising a housing to contain the fuel cell stack.*

*41. A fuel cell assembly comprising:*

*a fuel cell stack having a lower surface;*

*a housing for the fuel cell stack; and*

*three mounts and no more than three mounts which extend vertically downward from the lower surface of the fuel cell stack.*

*42. The fuel cell assembly of claim 41, wherein a first mount is arranged at a first end of the fuel cell stack, and second and third mounts are arranged at a second end of the fuel cell stack opposite the first end.*

*43. The fuel cell assembly of claim 19, wherein the plurality of stacked unit cells are stacked horizontally and the end plates clamp the plurality of stacked unit cells from either side thereof.*

*44. The fuel cell assembly of claim 38, wherein the fuel cell stack includes a plurality of stacked unit cells stacked horizontally and the end plates clamp the plurality of stacked unit cells from either side thereof.*

*45. The fuel cell assembly of claim 41, wherein the fuel cell stack includes a plurality of stacked unit cells stacked horizontally and end plates which clamp the plurality of stacked unit cells from either side thereof.*

*46. The fuel cell assembly of claim 19, wherein the three mounts are arranged on a floor of a housing.*

*47. The fuel cell assembly of claim 38, wherein the three mounts are arranged on a floor of a housing.*

*48. The fuel cell assembly of claim 41, wherein the three mounts are arranged on a floor of the housing.*

* * * * *